(12) United States Patent
González et al.

(10) Patent No.: US 10,596,979 B2
(45) Date of Patent: Mar. 24, 2020

(54) DEVICE FOR CAPTURING OPTICAL INFORMATION

(71) Applicant: Ficosa Adas, S.L.U., Barcelona (ES)

(72) Inventors: Adrián González, Barcelona (ES); Victor Iglesias, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 391 days.

(21) Appl. No.: 15/271,847

(22) Filed: Sep. 21, 2016

(65) Prior Publication Data

US 2017/0080878 A1   Mar. 23, 2017

(30) Foreign Application Priority Data

Sep. 22, 2015   (EP) ..................................... 15382459

(51) Int. Cl.
*B60R 11/04* (2006.01)
*H04N 5/225* (2006.01)
*B60R 11/00* (2006.01)

(52) U.S. Cl.
CPC ........... *B60R 11/04* (2013.01); *H04N 5/2251* (2013.01); *H04N 5/2252* (2013.01); *H04N 5/2256* (2013.01); *B60R 2011/004* (2013.01); *B60R 2011/0092* (2013.01); *B60R 2011/0094* (2013.01)

(58) Field of Classification Search
CPC ....... B60R 11/04; B60R 1/074; H04N 5/2251; H04N 5/2252; H04N 5/2256; B60R 2011/004; B60R 2011/0092; B60R 2011/0094
See application file for complete search history.

(56) References Cited

U.S. PATENT DOCUMENTS

| 2003/0202097 | A1* | 10/2003 | Kallhammer | B60R 1/00 348/148 |
| 2006/0171704 | A1* | 8/2006 | Bingle | B60R 11/04 396/419 |
| 2013/0016219 | A1 | 1/2013 | Hahner et al. | |
| 2013/0088599 | A1* | 4/2013 | Ulomek | B60R 11/04 348/148 |
| 2015/0183302 | A1* | 7/2015 | Da Deppo | B60R 11/04 49/324 |

FOREIGN PATENT DOCUMENTS

| DE | 102014217864 A1 * | 3/2016 | B60R 11/04 |
| JP | 2009167747 A * | 7/2009 | E02F 9/0858 |
| JP | 2009167747 A * | 7/2009 | E02F 9/0858 |

* cited by examiner

*Primary Examiner* — Maria E Vazquez Colon
(74) *Attorney, Agent, or Firm* — Cantor Colburn LLP

(57) ABSTRACT

A device for capturing optical information configured for being installed in a recess of an exterior surface of a vehicle, comprising at least an imaging means configured for obtaining optical information of the surroundings of the vehicle. The imaging means are movable between an operating position and a non-operating position, wherein in the non-operating position the imaging means is able to be located in the recess of the vehicle. The device also comprises a protective cover configured for being able to cover the opening of the recess when the imaging means is in an operating position outside the recess.

19 Claims, 6 Drawing Sheets

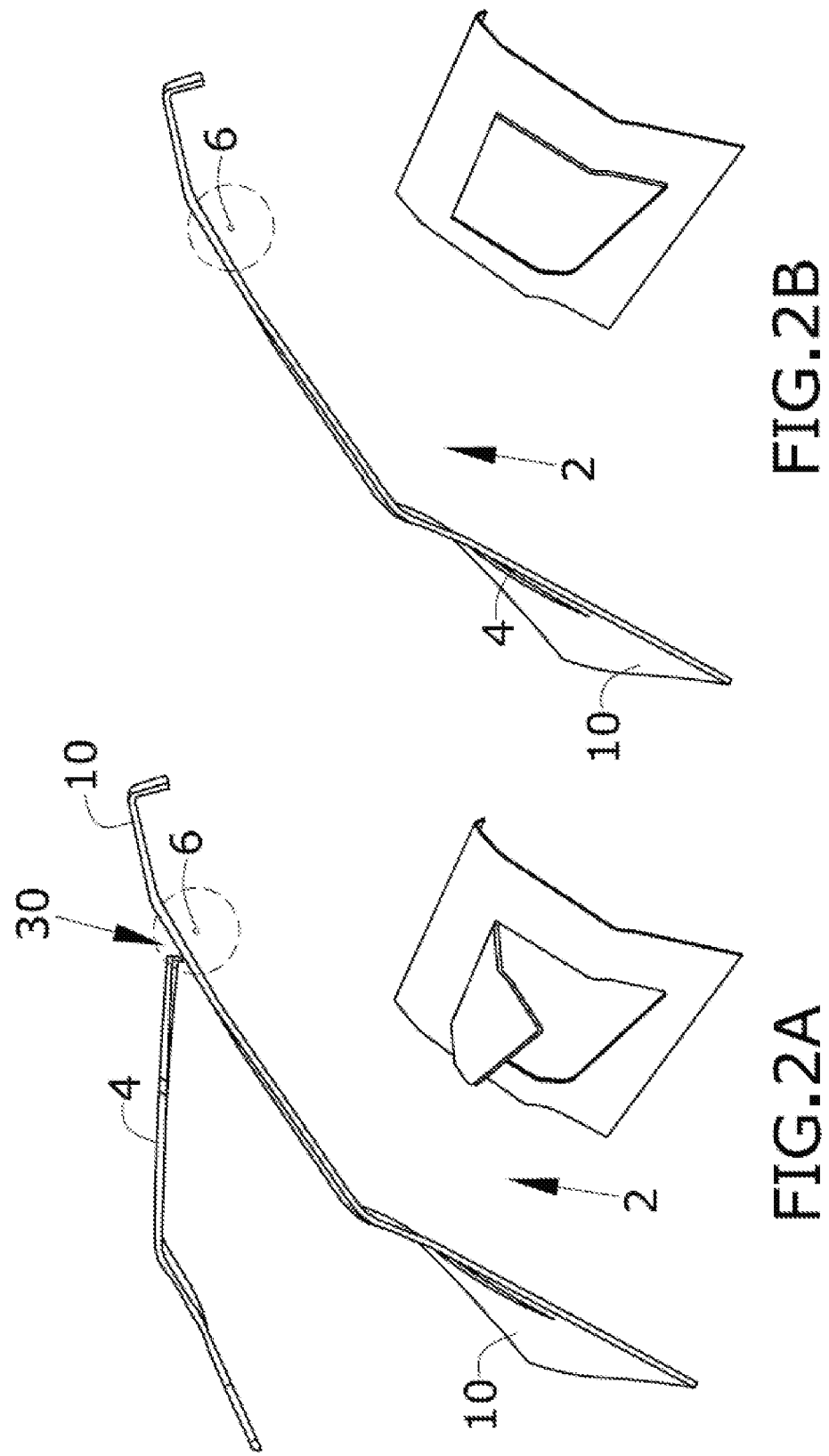

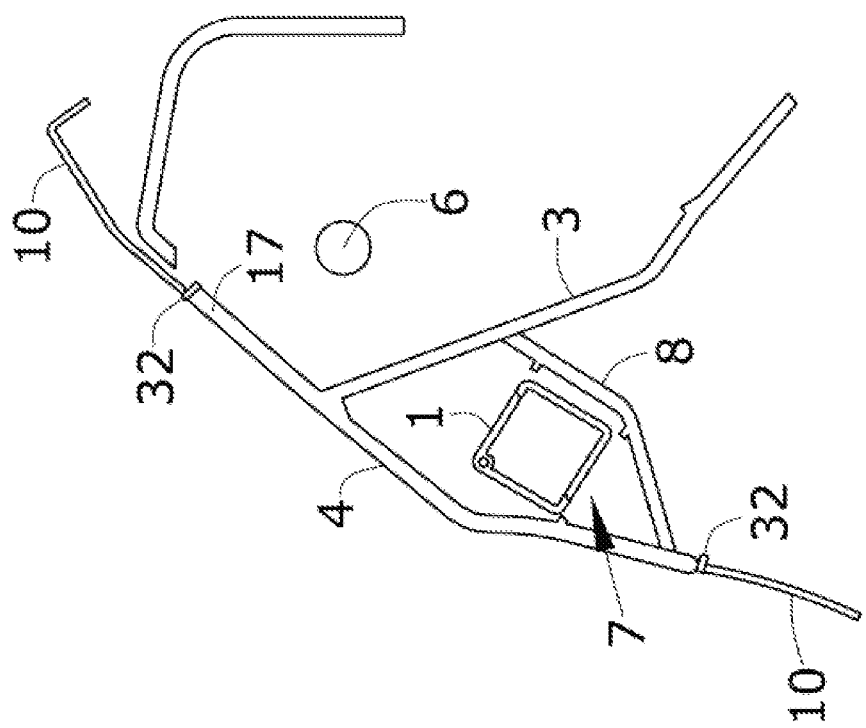
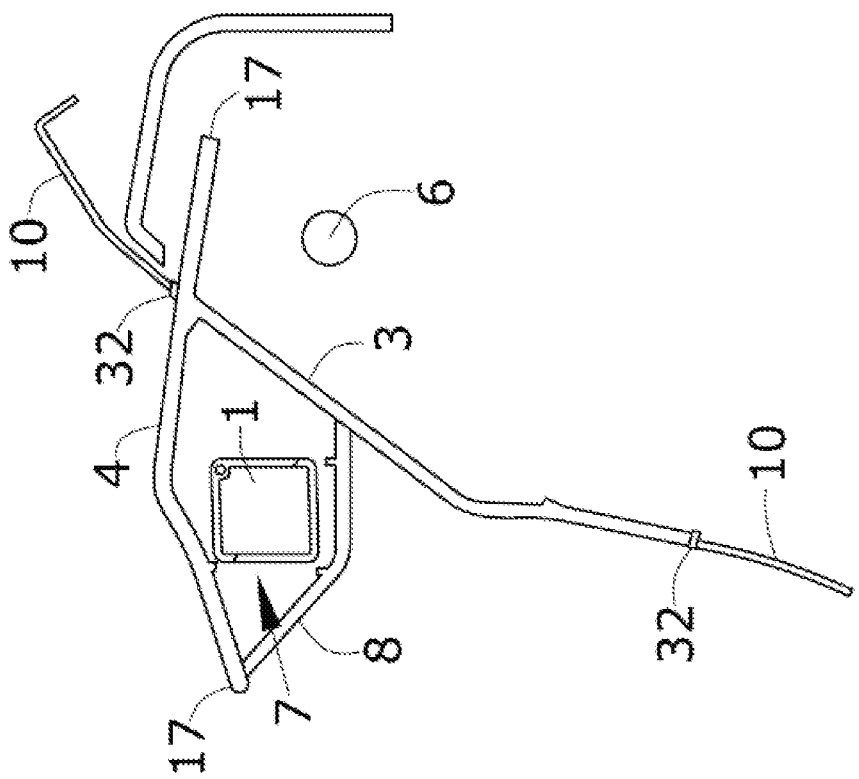

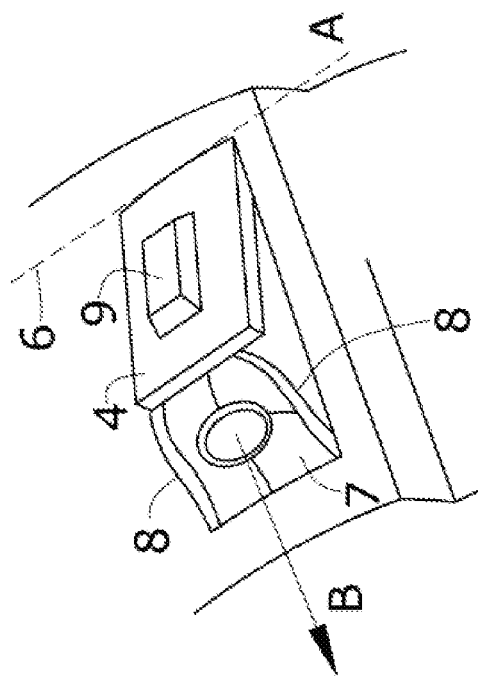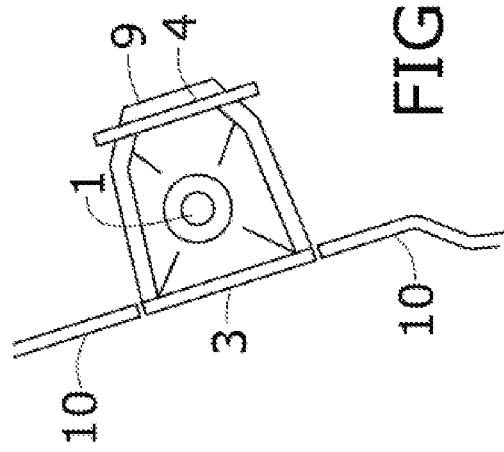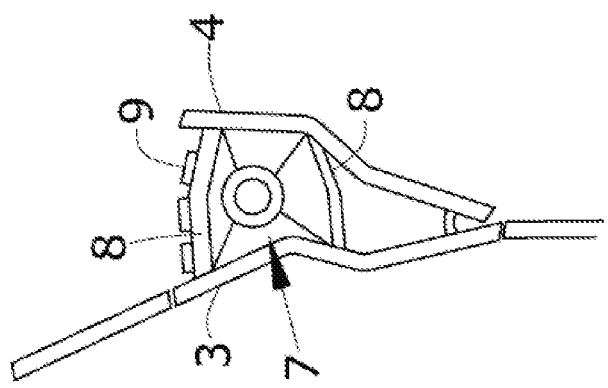

DEVICE FOR CAPTURING OPTICAL INFORMATION

CROSS-REFERENCES TO RELATED APPLICATIONS

This patent application claims priority to European Application No. 15382459.4, filed Sep. 22, 2015 which is incorporated herein by reference in its entirety.

FIELD OF THE INVENTION

The present invention refers to a device for capturing optical information for a vehicle. More specifically, said device is related to the design of a retractable camera monitoring system (CMS).

BACKGROUND OF THE INVENTION

The use of cameras or, more specifically, a camera unit for detecting the surrounding area of a vehicle, is known from the prior art. Such camera units are used, for example, as parking aids and/or maneuvering aids for motor vehicles, in order to detect, in particular, the areas around the vehicle that cannot be seen with conventional mirrors of motor vehicles.

Document US2013016219 discloses a device for capturing optical information for a vehicle with at least one camera with a protective cover wherein the camera can be pivoted about a pivot axis between a non-operating position and an operating position. The camera is located in a recess of the vehicle such that it is inaccessible from the outside in the non-operating position and in the operating position of the protective element the camera is active for image acquisition. The device has a drive unit for moving the camera unit and the protective element between the two mentioned positions.

The drawback of this arrangement is that when the camera is in an operating position the device negatively affects the aerodynamic behavior of the vehicle.

SUMMARY OF THE INVENTION

As previously explained in the background art, the device for capturing optical information is configured for being installed in a recess of an exterior surface of a vehicle. Therefore, all the elements of the device arrangement are integrated under the exterior surface of the vehicle, at least in a non-operating position. Said elements could include a camera, covers, a housing for supporting the camera, connectors, etc.

More specifically, the device comprises at least imaging means configured for imaging an image of the surroundings of the vehicle. The imaging means can refer in particular to a camera.

As the imaging means is located in a recess of the exterior surface of the vehicle in a non-operating position, it has to be moved outside the recess to perform their task of imaging an image of the surroundings and therefore being in an operating position. Therefore, the imaging means comprises two operative positions, the non-operating position in which it is located inside the recess and the operating position in which it is located outside the recess.

The device comprises a protective cover which is configured for covering the opening of the recess when the imaging means is in the operating position. Therefore, said cover protects the opening of the recess when the imaging means is located outside the recess.

The advantage of said protective cover is that the aerodynamic behavior of the vehicle is improved as the opening of the recess for allowing the entry and exit of the imaging means is kept hidden by said protective cover. Additional advantages are that the protective cover also improves the appearance of the vehicle and its watertightness. All these technical advantages are achieved when the imaging means is outside the recess.

DESCRIPTION OF THE DRAWINGS

To complete the description and in order to provide for a better understanding of the invention, a set of drawings is provided. Said drawings form an integral part of the description and illustrate preferred embodiments of the invention. The drawings comprise the following figures.

FIGS. 2A, 2B and 2C show two lateral views and a perspective view of the exterior surface of the vehicle and the protective cover of the first embodiment shown in FIG. 1.

FIGS. 3A and 3B show a schematic representation of the opening direction and method of aperture of a second embodiment of the device.

FIG. 6 shows the second embodiment of the invention in which the rotation axis is located under the imaging means instead of over the imaging means as shown in FIGS. 3 to 5.

FIGS. 7A and 7B show a third embodiment of the invention in which the rotation axis of the device is in a vertical position with respect to the vehicle.

DETAILED DESCRIPTION OF THE INVENTION

Figure 1:
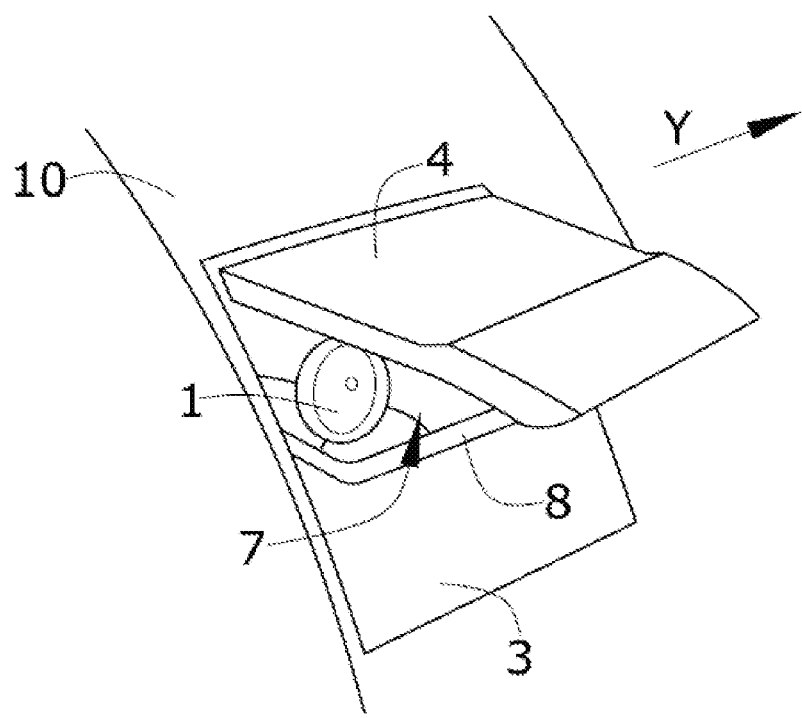
FIG. 1 shows a perspective view of a first embodiment of the invention in an operating position.

FIGS. 1 to 2 show a first embodiment of the invention, FIGS. 3 to 6 show a second embodiment and FIG. 7 shows a third embodiment. All embodiments of the device are located in a recess 2 of the exterior surface 10 of the vehicle and the imaging means 1 is movable between an operating position and a non-operating position. In the non-operating position the imaging means 1 is located in the recess 2 and in the operating position the imaging means 1 is located outside the recess 2.

The device comprises a protective cover 3 configured for covering the opening of the recess 2 when the imaging means 1 is in an operating position as can be clearly seen, for instance, in FIGS. 1, 3A, 5, 6 and 7B.

More specifically, in the disclosed embodiments the protective cover 3 is movable between a first position in which the imaging means 1 is located inside the recess 2 and the protective cover 3 does not cover the opening of the recess 2, for instance, because said cover 3 is also located inside said recess 2, and a second position in which the protective cover 3 covers the opening of the recess 2 and the imaging means 1 is in an operating position.

In order to simplify the movement of the imaging means 1 and the protective cover 3, in the depicted figures, the imaging means 1 is coupled to the protective cover 3 such that the imaging means 1 and the protective cover 3 are moved together from the non-operating position to the operating position.

Preferably, the protective cover 3 will follow the aesthetic lines of the exterior surface 10 of the vehicle in order to better improve its aerodynamic efficiency, minimizing the air resistance. As a result, protective cover 3 covers the opening of the recess 2 in a substantially flush manner with respect to the exterior surface 10 of the vehicle in the operating position. Therefore, the protective cover 3 follows the contour of the exterior surface 10 of the vehicle when it covers the opening of the recess 2 in the operating position.

Additionally, the device further comprises a front protective cover 4 being configured for covering the opening of the recess 2 when the imaging means 1 is located in the recess 2 in a non-operating position. Therefore, when the imaging means 1 is in the retracted position, ie, located inside the recess 2, both the imaging means 1 and the whole recess 2 are also protected by means of the front protective cover 4 from the effects of the weather, such as for example soiling and/or water.

Preferably, the front protective cover 4 will follow the aesthetic lines of the exterior surface 10 of the vehicle in order to better improve its aerodynamic efficiency, minimizing the air resistance. As a result, the front protective cover 4 covers the opening of the recess 2 in a substantially flush manner with respect to the exterior surface 10 of the vehicle in the non-operating position and, therefore, it follows the contour of the exterior surface 10 of the vehicle when it covers the opening of the recess 2 in the non-operating position.

In the disclosed embodiments, the imaging means 1 is coupled to the protective covers 3, 4 such that they are moved together from the non-operating position to the operating position. Particularly, the device comprises a pivot axis 6 configured such that the imaging means 1, the protective cover 3 and the front protective cover 4 are pivoted between the operating and non-operating positions around said pivot axis 6.

As shown in FIGS. 1 and 6, in the first and second embodiments of the invention the pivot axis 6 is located in a plane parallel to the XY plane of the vehicle while the imaging means 1 is configured for pointing out towards the rear part of the vehicle.

FIGS. 7A and 7B disclose a third embodiment in which the pivot axis 6 is located in a plane parallel to the YZ plane of the vehicle while the imaging means 1 is configured for pointing out towards the rear part of the vehicle.

In all embodiments, the pivot axis 6 is located inside the recess 2. More specifically, FIGS. 1, 2, 6 and 7 disclose two embodiments in which the front protective cover 4 is located outside the recess 2 when the device is in an operating position and FIGS. 3 to 5 disclose an embodiment in which the front protective cover 4 is partially located inside the recess 2 when the device is in an operating position as the rear part 17 of said front protective cover 4 is located inside the recess 2 as can be clearly seen in FIG. 3A.

Locating the front protective cover 4 partially inside the recess 2 has the advantage over the other embodiments that the integration of the device in the vehicle is more simple as the rotation axis 6 is completely located inside the recess 2 of the vehicle and as a consequence the device takes up less space in the vehicle. To the contrary, the length of the front protective cover 4 remaining outside the recess 2 of the vehicle when the device is in the operating position is lesser than in the embodiments shown in FIGS. 1, 2, 6 and 7, that leading to a lesser field of view of the imaging means 1.

To the contrary, the embodiment disclosing the front protective cover 4 completely outside the recess 2 has the disadvantage that it provides a lower degree of ingress protection (i.e. IP Code) due to the adjustment between the contours of the front protective cover 4 and of the exterior surface 10 of the vehicle.

Additionally, in the embodiments disclosing a protective cover 3, 4 partially located inside the recess 2 in the operating position, the vehicle comprises a mechanical gasket 32 for sealing the opening of the recess 2 which is located in the periphery of the opening and is configured such that it is adapted to be located between every cover 3, 4 and said periphery so as to perform a sealing as it is pressed by the covers 3, 4 in both positions and also during the movement between said two positions. In the embodiment shown in FIGS. 3A and 3B the gasket 32 is adapted to be in contact with both covers 3, 4 in both positions, ie, the operating position and the closed position.

Figure 2C:
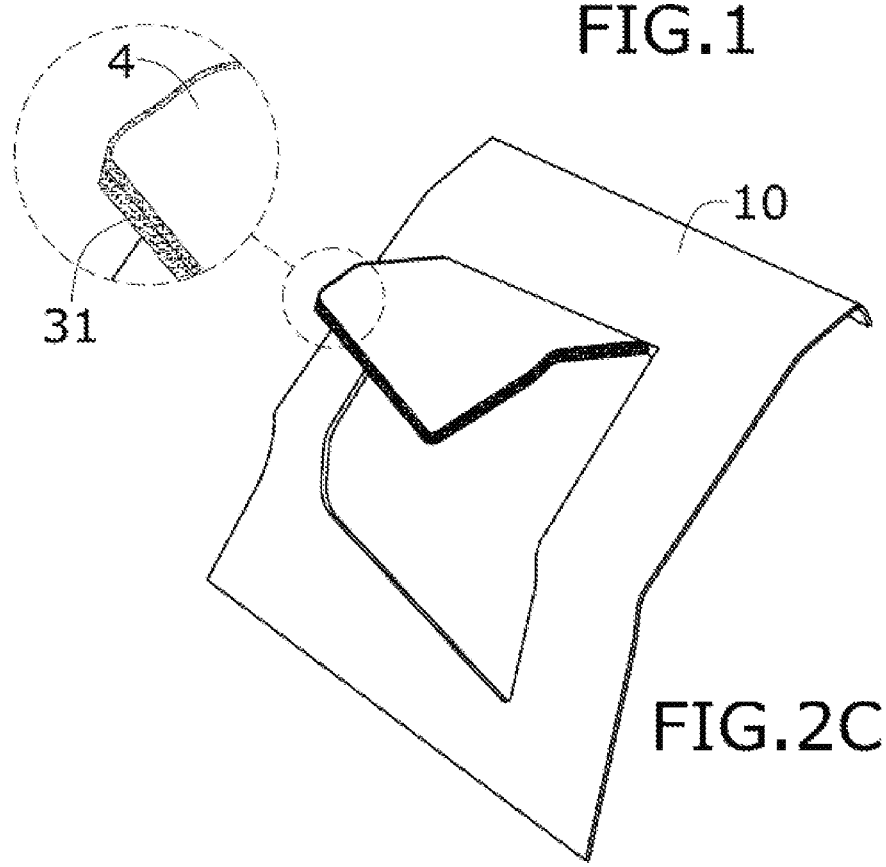
Figure 4:
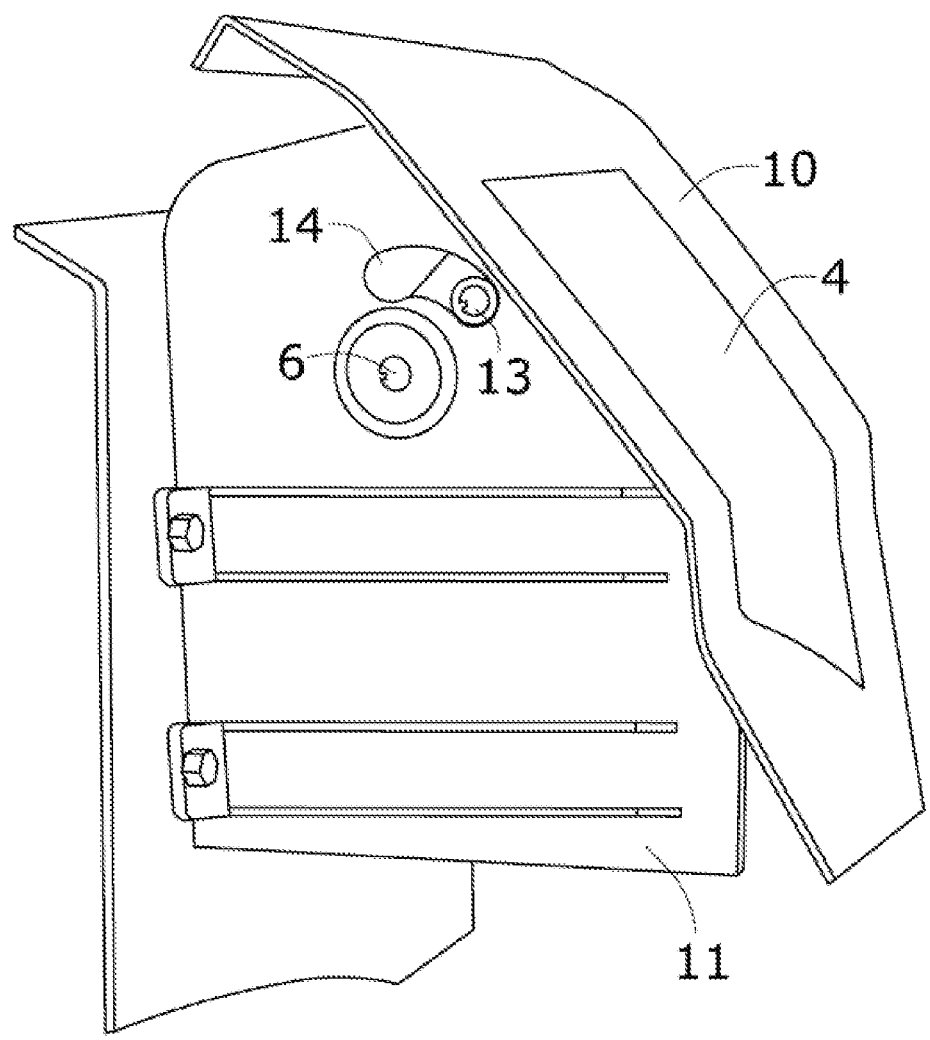
FIG. 4 shows a lateral view of the second embodiment in a non-operating position, wherein the imaging means is located inside the recess of the vehicle.

As previously stated, the embodiment shown in FIGS. 2A, 2B and 2C has the drawback that there is a clearance 30 in the operating position between the front protective cover 4 and the exterior surface 10 of the vehicle, that leading to a more complicated design of the sealing element of the device. More specifically, FIG. 2C discloses a foam 31 for sealing the opening of the recess 2. The foam 31 is located in the periphery of the front protective cover 4 and is configured such that it is adapted to be located between the front protective cover 4 and the periphery of the opening of the recess 2 so as to perform a sealing as it is pressed by the front protective cover 4 in both positions, ie, operating and non-operating position, and also during the movement between said two positions. For fulfilling this task and due to the previously mentioned clearance 30, the thickness of the foam 31 is greater than the clearance 30 such that the foam is compressed by the front protective cover 4 and the periphery of the opening in the operating position of the imaging means 1 so as to ensure sealing.

In the depicted embodiments, the imaging means 1 is a camera, being the camera 1 enclosed by a casing 7 comprising lateral walls 8 extending between the protective cover 3 and the front protective cover 4 such that the imaging means 1 is completely enclosed by the lateral walls 8 and the protective covers 3, 4.

Additionally, the device comprises at least an illumination module 9, such as, for example, a blinker or a puddle lamp. Said illumination module 9 could be located on the front protective cover 4 or on a lateral wall 8 of the casing 7.

In addition to this, the camera 1 is located inwardly displaced with respect to the edge of the front protective cover 4 such that said cover 4 acts as a shield and prevents water impinging directly on the lens surface.

Figure 5:
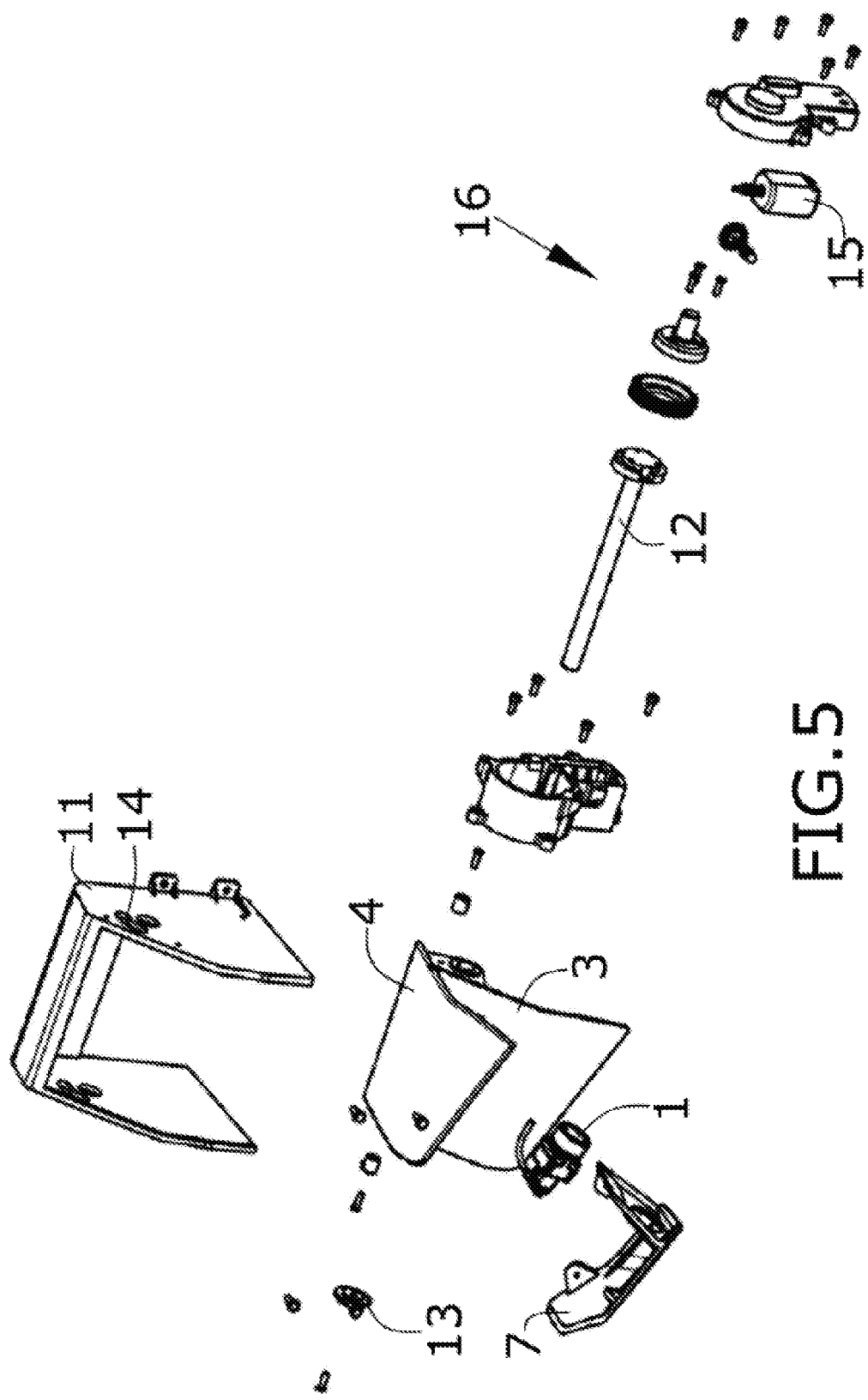
FIG. 5 shows a perspective view of the components of the second embodiment.

FIG. 5 discloses an exploded view of the second embodiment of the invention. The device comprises a housing 11 for supporting a shaft 12 while the covers 3, 4 are hinged to the shaft 12. The camera 1 is located inbetween said covers 3, 4 and is also enclosed by the casing 7.

The shaft 12 comprises a stopper 13 for defining the two positions of the device and, hence, limiting the movement of the shaft 12, the covers 3, 4 and the imaging means 1. The stopper 13 consists of an abutment sliding in a slit 14 of the housing 11. Alternative configurations of the stopper 13 are possible whilst the stopper is adapted to limit the movement of the shaft 12, the covers 3, 4 and the imaging means 1 between both positions of the device.

The shaft 12 is operatively connected to a driving unit 15 for moving the covers 3, 4 and the imaging means 1. The driving unit 15 is a DC electric motor. The embodiment also comprises a transmission using a gearbox 16. The gearbox 16 comprises two sets of worm and wormgear for transmitting the movement from the driving unit 15 to the shaft 12.

Other possible actuation methods are a servomotor, an electric or a pneumatic piston.

Finally, the electrical power supply is managed by a PCBA (Printed Circuit Board Assembly).

It is also an object of the present application a system for capturing optical information that comprises a device for capturing optical information as described above and a also a processing means. The processing means is adapted to receive and process an unlocking signal so as to:

generate a deployment signal such that the imaging means 1 moves from the non-operating position to the operating position, and generate an activation signal so as to activate the imaging means 1.

The processing means are also adapted to receive and process an unlocking signal so as to:

generate a concealment signal such that the imaging means 1 moves from the operating position to the non-operating position, and generate a deactivation signal so as to deactivate the imaging means 1.

Moreover, as previously described, a method for capturing optical information would comprise the steps of providing a device for capturing optical information in a recess 2 of an exterior surface 10 of a vehicle, the device comprising at least an imaging means 1 configured for imaging an image of the surroundings of the vehicle, the imaging means 1 being movable between an operating position and a non-operating position, wherein in the non-operating position the imaging means 1 is able to be located in the recess 2 of the vehicle. Said method would be characterised in that it further comprises the step of providing a protective cover 3 configured for being able to cover the opening of the recess 2 when the imaging means 1 is in an operating position outside the recess 2.

More specifically, the method further comprises the steps of:

sending an unlocking first signal to a central control unit, the central control unit sending a second signal to a control unit of the device for capturing optical information, said second signal activating the imaging means 1 and activating the deployment of the imaging means 1.

The first signal could be emitted by a user of the vehicle together with a signal for locking or unlocking the doors of the vehicle or could be emitted by the user of the vehicle together with a signal for stopping/starting the engine of the vehicle. In the case of a vehicle having an automatic transmission, the first signal could be emitted by shifting the gear lever to a position different from parking P or by pressing the brake pedal to unlock the gear lever from the parking position P. If the vehicle has a manual transmission, the first signal could be emitted by shifting the gear lever to a position different from neutral N.

The invention claimed is:

1. A device adapted to be installed in a recess that communicates through an exterior surface of a vehicle, the device comprising:

at least an imaging means configured to produce an image of external surroundings of the vehicle, the imaging means being movable between an operating position and a non-operating position, and when in the non-operating position, the imaging means is arranged to be located in the recess of the vehicle; and a protective cover configured to be arranged to cover the opening of the recess thereby enclosing the recess when the imaging means is in an operating position outside the recess, the protective cover constructed to be flush with the exterior surface when in the operating position, wherein the imaging means is coupled to the protective cover such that the imaging means and the protective cover are moved together from the non-operating position to the operating position.

2. The device according to claim 1, wherein the protective cover is movable between a first position in which the imaging means is able to be located in the recess and the protective cover is not able to cover the opening of the recess and a second position in which the protective cover is able to cover the opening of the recess and the imaging means is in an operating position.

3. The device according to claim 1, further comprising:

a front protective cover configured to cover the opening of the recess when the imaging means is located in the recess and when in the non-operating position.

4. The device according to claim 3, wherein the protective cover is coupled to the front protective cover such that they are moved together from the non-operating position to the operating position.

5. The device according to claim 4, wherein the imaging means, the protective cover and the front protective cover are constructed to pivot about a pivot axis between the operating and non-operating positions.

6. The device according to claim 5, wherein the pivot axis is located inside the recess.

7. The device according to claim 6, wherein the front protective cover is configured to be arranged partially inside the recess when the device is in the operating position.

8. The device according to claim 6, wherein the front protective cover is configured to be arranged outside the recess when the device is in the operating position.

9. The device according to claim 3, further comprising:

a casing for enclosing the imaging means the casing comprising lateral walls extending between the protective cover and the front protective cover.

10. The device according to claim 1, further comprising:

an illumination module.

11. The device according to claim 10, wherein the illumination module is located in one of the front protective cover and a lateral wall of the casing.

12. A system for capturing optical information comprising the device according to claim 1 and a processing means, the processing means adapted to receive and process an unlocking signal so as to:

generate a deployment signal such that the imaging means moves from the non-operating position to the operating position, and generate an activation signal so as to activate the imaging means.

13. A system for capturing optical information comprising the device according to claim 1 and a processing means, the processing means adapted to receive and process an unlocking signal so as to:

generate a concealment signal such that the imaging means moves from the operating position to the non-operating position, and generate a deactivation signal so as to deactivate the imaging means.

14. A device comprising:
a housing adapted to be rigidly fixed to a vehicle, the housing defining at least in-part a recess adapted to communicate through an external surface of the vehicle;
a first cover;
a second cover rigidly attached to the first cover;
an imaging means rigidly attached to at least one of the first and second covers, the imaging means and the first and second covers pivotally attached to the housing, wherein the imaging means and the first and second covers pivotally move between operating and non-operating positions; and
when in the non-operating position, the second cover and the imaging means are concealed in the recess by the first cover that encloses the recess, and when in the operating position the imaging means is exposed outside of the recess and the second cover encloses the recess.

15. The device set forth in claim 14, wherein the first cover is flush with the exterior surface when in the non-operating position.

16. The device set forth in claim 14, wherein the recess communicates through the exterior surface via an opening defined by the exterior surface, and wherein the opening is substantially planar.

17. The device set forth in claim 16, wherein the first cover projects through the opening when in the operating position.

18. The device set forth in claim 3, further comprising:
a gasket carried between the front protective cover and a periphery of the exterior surface that defines the opening, the gasket adapted to seal the opening when in the non-operating position.

19. The device set forth in claim 3, further comprising:
a foam attached to a peripheral portion of the front protective cover and located between the front protective cover and a periphery of the exterior surface that defines the opening, the foam being constructed to be sealingly compressed by the front protective cover when in at least one of the operating and non-operating positions.

* * * * *